United States Patent Office 2,865,908
Patented Dec. 23, 1958

2,865,908

STILBENE AZO DYES

Leon Brian De Hoff, Plainfield, N. J., assignor to American Cyanamid Company, New York, N. Y., a corporation of Maine No Drawing. Application October 25, 1954
Serial No. 464,637

5 Claims. (Cl. 260—143)

This invention relates to a novel process of preparing stilbene azo dyes and to the new dyestuffs obtained therefrom.

A common commercial process for preparing stilbene azo dyes involves the reduction, under alkaline conditions, of 4,4'-dinitrostilbene-2,2'-disulfonic acid, or the metallic salt thereof, e. g. the disodium salt, with a reducing agent such as glucose, sodium sulfite, sodium sulfide, formaldehyde, acetaldehyde and the like, to produce dyes known as Stilbene Yellows. The commercial products have a hue designation on the Munsell Color System up to about 6Y.

In accordance with the present invention, it has been discovered that if the reduction of the dinitrostilbenedisulfonic acid is carried out in the presence of definite quantities of water-soluble salts of an alkali metal or an alkaline earth metal, excellent yields of much greener stilbene yellow dyes are obtained. Surprisingly, the addition of these water-soluble salts results in the production of greener shades of stilbene yellow dyes than have heretofore been produced. Thus, the present process makes it possible for the first time to produce greener shade stilbene yellow dyestuffs of excellent brightness and which according to the Munsell Color System have a hue of from about 8Y to 10Y.

The salts used are water-soluble and preferably are such that the cation of the salt forms no difficultly water-soluble or difficultly filterable salt of the dyestuff. Thus the sulfates, chlorides, etc., of the alkali metals or the alkaline earth metals such as the sodium, potassium, calcium or barium salts, or ammonium salts may be used. Sodium chloride or sulfate is preferred from the standpoint of cost.

The quantity of salt used during the reduction is a critical factor. In order to obtain the desirable greener shades of stilbene yellow dyes, I have found that the concentration of salt that may be used ranges from about 5% to about 15% based on the weight of the solvent or diluent, e. g. water, alcohol-water mixtures, etc., in the reaction. The preferred concentration of salt is 8–9%.

The temperature of the reaction may vary from 50–80° C. with the preferred range being 65–70° C.

While any of the ordinary reducing agents used in this type of reduction such as glucose, sodium sulfite, etc., may be used, I prefer to use an aldehyde such as formaldehyde, acetaldehyde, or glucose, and preferably I use formaldehyde in the reduction reaction. It has been found that the amount of reducing agent which may be used in the reaction is not unduly critical. Obviously, there must be sufficient reducing agent to complete the desired reduction of dinitrostilbenedisulfonic acid. The use of a large excess of reducing agent is undesirable and results in a redder shade stilbene yellow dye. Thus, for example, the amount of formaldehyde or glucose may range from about 4 to 6 mol equivalents for each mol of dinitrostilbenedisulfonic acid.

The use of salt in the reduction reaction of the present invention is not to be confused with the simple salting out of a dye after it is formed and which is a common method of isolation of dyestuffs. The novel stilbene yellow dyes of this invention cannot be obtained by a simple salting out procedure after the formation of the dye. The salt must be present during the reduction of the dinitrostilbenedisulfonic as hereinbefore described.

The invention will be described in greater detail in conjunction with the following specific examples in which the parts are by weight unless otherwise specified.

*Example 1*

An aqueous paste containing 44 parts of 4,4'-dinitrostilbene-2,2'-disulfonic acid as the disodium salt is added to 830 parts of water and warmed to 55° C. until a solution results. To this solution is added 30 parts of sodium hydroxide dissolved in 90 parts of water. The temperature of the solution is then increased to 60° C., and 100 parts of sodium chloride is added slowly with stirring. The temperature of the suspension is then raised to 70° C. and 6.4 parts of formaldehyde in aqueous solution (14 parts of aqueous 37% formaldehyde solution) is added gradually with stirring. The mixture is then stirred at 70° C. until the reaction is substantially complete. Without further heating, sufficient concentrated sulfuric acid is then added to bring the mixture to a pH of about 6.8. 20 parts of sodium chloride is added and the mixture is allowed to cool to room temperature with stirring. The dye is then removed by filtration and dried at about 90° C. The green shade yellow dye is obtained in good yield. It has a hue designation of 9.3Y according to the Munsell Color System.

*Example 2*

The procedure of Example 1 is followed except that 60 parts of calcium chloride are used instead of the sodium chloride used therein. The same shade dyestuff is obtained in good yield.

*Example 3*

The procedure of Example 1 is followed except that 160 parts of sodium sulfate is used. The same shade dyestuff is obtained in good yield.

*Example 4*

The procedure of Example 1 is followed except that 120 parts of sodium chloride are used. A good yield of a green shade yellow dye is obtained which has a hue designation of 9.7Y on the Munsell Color System.

*Example 5*

The procedure of Example 1 is followed except that 2.5 parts of acetaldehyde are used in place of the formaldehyde used therein. The same shade dyestuff is obtained in good yield.

*Example 6*

The procedure of Example 1 is followed except that 7 parts of glucose are used in place of the formaldehyde used therein. The same shade dyestuff is obtained in good yield.

*Example 7*

The procedure of Example 1 is followed except that 80 parts of potassium chloride are used instead of the sodium chloride used therein. The same shade dyestuff is obtained in good yield.

*Example 8*

The procedure of Example 1 is followed except that in place of the 830 parts of water, 83 parts of 95% ethanol and 747 parts of water are used. A good yield of dye similar in shade to that obtained in Example 1 is obtained.

I claim:

1. A process of preparing stilbene azo dyes which on the Munsell Color System have a hue designation of from 8Y to 10Y which comprises treating a compound selected from the group consisting of 4,4'-dinitrostilbene-2,2'-disulfonic acid and alkali metal salts thereof in an aqueous alkaline medium with a reducing agent selected from the group consisting of formaldehyde, acetaldehyde and glucose, in the presence of a water-soluble salt selected from the group consisting of the water-soluble chlorides and sulfates of alkali and alkaline earth metals and ammonia, the quantity of said water-soluble salt being from about 5% to about 15% by weight of the aqueous solvent present in the reaction mixture.

2. A process according to claim 1 in which the reducing agent is formaldehyde.

3. A process according to claim 1 in which the reducing agent is glucose.

4. A process according to claim 1 in which the water-soluble salt is sodium chloride.

5. A process of producing stilbene azo dyes which on the Munsell Color System have a hue designation of from 8Y to 10Y which comprises treating the disodium salt of 4,4'-dinitrostilbene-2,2'-disulfonic acid in an aqueous alkaline medium with formaldehyde in the presence of sodium chloride, the quantity of sodium chloride being about 5% to about 15% by weight of the aqueous solvent present in the reaction mixture.

References Cited in the file of this patent

UNITED STATES PATENTS

| | | |
|---|---|---|
| 456,628 | Martins | July 28, 1891 |
| 1,082,924 | Blank et al. | Mar. 28, 1913 |
| 1,878,501 | Lyford | Feb. 1, 1929 |
| 2,263,994 | Knight | Nov. 25, 1941 |